A. M. BRUBAKER.
Hitching-Straps.
No. 136,811. Patented March 18, 1873.
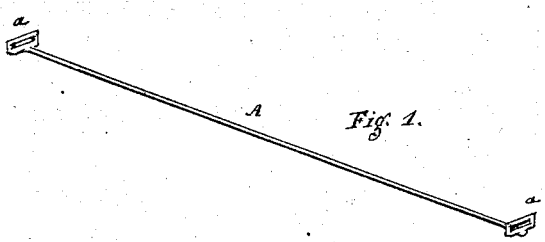
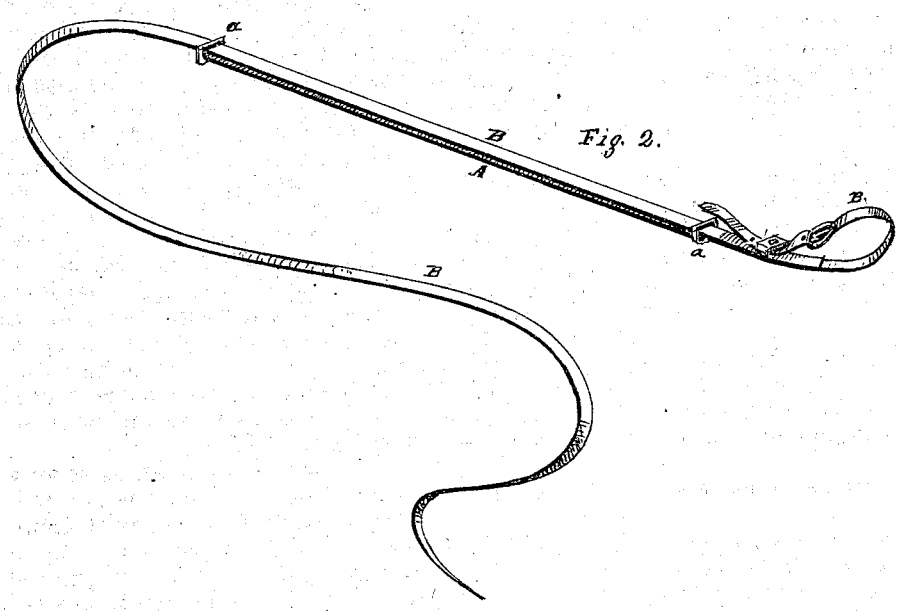
Witnesses.
Inventor.
Almus M Brubaker

UNITED STATES PATENT OFFICE.

ALMUS M. BRUBAKER, OF MILLERSVILLE, ASSIGNOR OF TWO-THIRDS HIS RIGHT TO WILLIAM COMPTON AND ABRAHAM B. GREENWALT, OF LANCASTER, PENNSYLVANIA.

IMPROVEMENT IN HITCHING-STRAPS.

Specification forming part of Letters Patent No. 136,811, dated March 18, 1873.

*To all whom it may concern:*

Be it known that I, ALMUS M. BRUBAKER, of Millersville, in the county of Lancaster, in the State of Pennsylvania, have invented certain Improvements in a Rod and Hitching-Strap combined, of which the following is a specification:

The nature of my invention consists in turning the ends of the iron or steel rod used up at right angles to the rod, said ends flattened out, or so as to have an open slot for the reception of a continuous hitching-strap, in order that when the rod breaks, as occasionally happens, the horse still remains hitched, which is not the case when the strap or hitching loop is at one end of the rod and the other end of the strap connected with the outer end of the said rod, besides other advantages herein mentioned.

The drawing illustrates my invention, in which—

Figure 1 shows the rod A with its terminal loops *a a;* Fig. 2, the same, with the hitching-strap B slipped through the loops.

The rod is a separate part, as shown, and can be laid in the box of the vehicle.

Physicians or men of business are often obliged to hitch their horses to trees before dwellings. These are often damaged by horses gnawing the bark; and like in patent No. 67,689, August 13, 1867, the rigid bar prevents a horse from doing damage to a tree, or rubbing or injuring the harness or head-gear.

My hitching-strap B is the same as commonly used, and may be terminated at one end with a snap or buckle-loop, to be attached to the bridle, and of any desired width and length.

The rigid rod A may be two feet long, round, or flattened above and rounded on the under side, with the ends *a* bent up at right angles and flattened and perforated with an oblong slot for the reception of the hitching-strap B. It is only necessary to pass the said strap through the eyes or vertical loops on the rod and tying the end of said strap around the tree or hitching-post and the rigid bar performs all the functions, as if the bar had separate straps at each end, one to secure to the post, and the other end attached to the bridle.

With this advantage—that is, the use of a continuous strap with the rod—in case the rod should be broken the horse is not thereby disengaged from his fastening so as to escape with damage perhaps to the horse or vehicle, and while the same strap can be used with or without the rod; but I do not claim a hitching-strap without the bar A; nor do I claim the bar, independently considered from its mode of application and use; hence, I also disclaim a hitching device consisting of a rod or bar, A when separate straps, or their equivalents, are secured to the ends of said bar, as in the patent referred to.

What I claim as my invention, and desire to secure by Letters Patent, for the purpose of securing the hitching, and guarding against the consequences of breaking the rod, is—

The combination of a rigid detachable rod, A, with loops *a*, with a continuous hitching-strap, B, in the manner and for the purpose specified.

ALMUS M. BRUBAKER.

Witnesses:
 WM. B. WILEY,
 JACOB STAUFFER.